United States Patent
Yokota et al.

[11] Patent Number: 5,874,504
[45] Date of Patent: Feb. 23, 1999

[54] GOLF BALL

[75] Inventors: Masatoshi Yokota, Shirakawa; Tsutomu Hirau, Kobe, both of Japan

[73] Assignee: Sumitomo Rubber Industries, Ltd., Hyogo-ken, Japan

[21] Appl. No.: 899,171

[22] Filed: Jul. 23, 1997

[30] Foreign Application Priority Data

Jul. 23, 1996 [JP] Japan .................................... 8-193270

[51] Int. Cl.$^6$ ..................................................... C08F 8/00
[52] U.S. Cl. ......................... 525/193; 525/194; 525/197; 525/198
[58] Field of Search ................................... 525/193, 194, 525/192, 197

[56] References Cited

U.S. PATENT DOCUMENTS 5,255,922 10/1993 Proudfit .............................. 273/235 R
5,681,898 10/1997 Pocklington .............................. 525/193

*Primary Examiner*—Mark L. Warzel

[57] ABSTRACT

The present invention provides a method for preparing a rubber composition for golf balls having excellent workability. The present invention related to a method for preparing a rubber composition for golf balls comprising at least a base rubber, a metal salt of α,β-unsaturated carboxylic acid, a filler and an organic peroxide, comprising the steps of, (a) mixing the base rubber and the metal salt of α,β-unsaturated carboxylic acid to obtain a pre-mixture, (b) adding the filler and the peroxide to the pre-mixture, and mixing in a mixing machine at the number of revolutions of 10 to 50 rpm for 2 to 6 minutes, and (c) discharging the mixed rubber composition with controlling the temperature of the rubber composition to 100° to 120° C.

3 Claims, 2 Drawing Sheets

GOLF BALL

FIELD OF THE INVENTION

The present invention relates to a method for preparing a rubber composition for golf balls. More particularly, it relates to a method for preparing a rubber composition for golf balls having excellent workability.

BACKGROUND OF THE INVENTION

A one-piece golf ball or a core for a multi-piece golf ball whose a representative example is a two-piece golf ball is generally obtained by introducing a rubber, a metal salt of α,β-unsaturated carboxylic acid as a co-crosslinking agent, a filler, an organic peroxide, and the like into a kneader or a Banbury mixer, and mixing them to obtain a rubber composition, followed by vulcanizing or press-molding. However, since the all components for the rubber composition are simultaneously poured into the mixer, mixing is difficult and dispersibility is poor. Since the mixing temperature is as high as more than 130° C., the decomposition of the peroxide and the reaction of the metal salt of α,β-unsaturated carboxylic acid with the metal oxide as a filler would occur. When the reaction occurs, the rebound characteristics of the golf ball obtained by molding the resulting rubber composition is degraded.

In order to solve the problem, it is attempted that the co-crosslinking agent and the filler (metal oxide) are separately mixed with the base rubber and the like and then the both are blended together with immediately before extruding, as described in Japanese Patent Kokai Publication 319373/1992, but the workability is degraded because of two separate mixing processes.

OBJECTS OF THE INVENTION

A main object of the present invention is to provide a method for preparing a rubber composition for golf balls. The rubber composition has excellent kneadability and excellent workability. The golf ball obtained from the rubber composition shows excellent rebound characteristics.

According to the present invention, the object described above has been accomplished by the method which comprises the steps of mixing the base rubber and the co-crosslinking agent to obtain a pre-mixture, adding the filler and the peroxide to the pre-mixture, and then mixing the mixture with a mixing machine while controlling the temperature of the composition by adjusting the number of revolutions of the machine and the mixing time.

SUMMARY OF THE INVENTION

Figure 1:
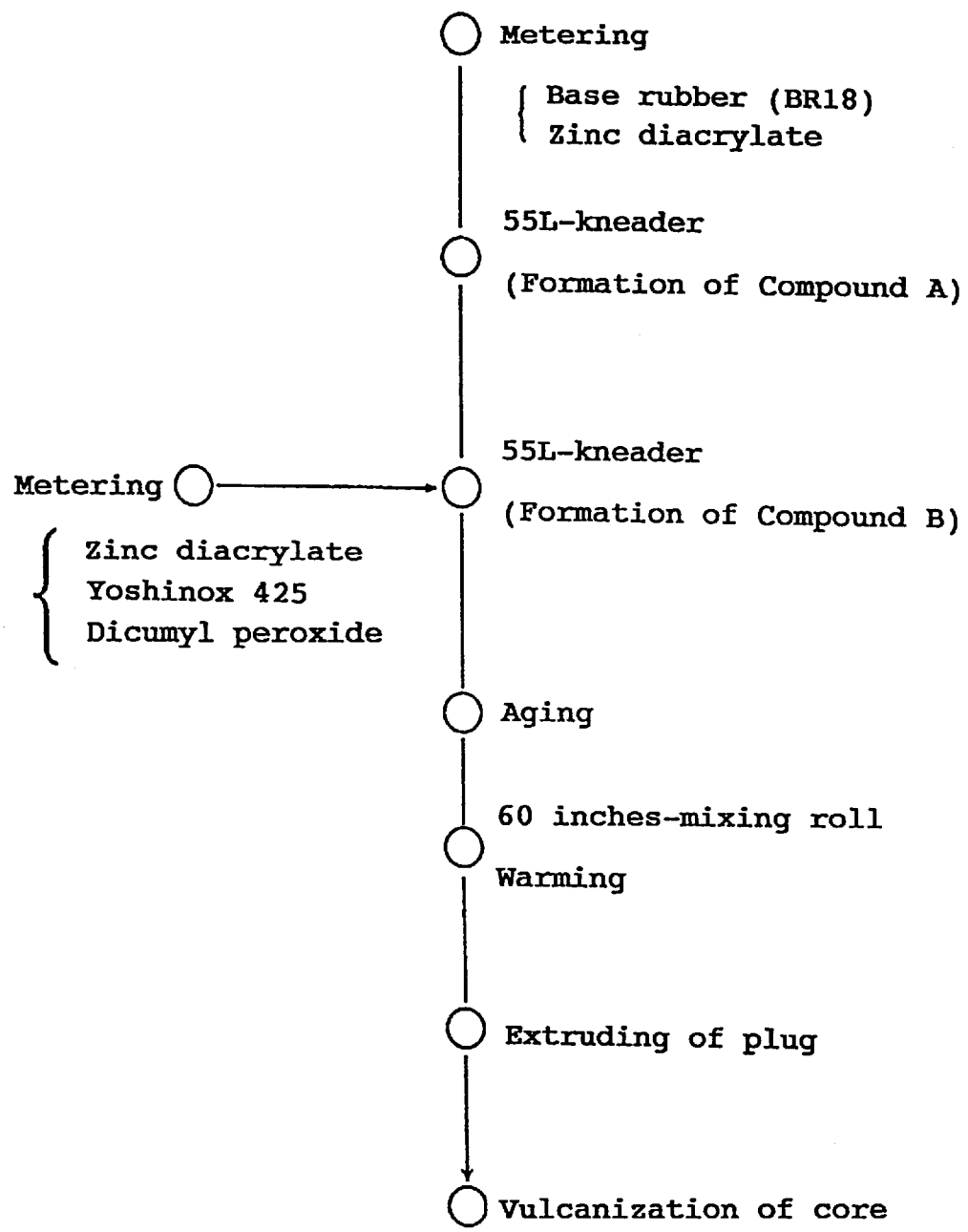
FIG. 1 is a flow chart illustrating the method for preparing the golf balls of the present invention.

The present invention provides a method for preparing a rubber composition for golf balls comprising at least a base rubber, a metal salt of α,β-unsaturated carboxylic acid, a filler and an organic peroxide, comprising the steps of, (a) mixing the base rubber and the metal salt of α,β-unsaturated carboxylic acid to obtain a pre-mixture, (b) adding the filler and the peroxide to the pre-mixture, and mixing in a mixing machine at the number of revolutions of 10 to 50 rpm for 2 to 6 minutes, and (c) discharging the mixed rubber composition with controlling the temperature of the rubber composition to 100° to 120° C.

DETAILED DESCRIPTION OF THE INVENTION

The method for preparing the rubber composition for golf balls of the present invention can be applied for a one-piece golf ball, a core of a multi-piece golf ball such as a two-piece golf ball and a three-piece golf ball, a center of a thread wound golf ball. In order to simply explain the method of the present invention, two-piece golf balls will be used hereinafter for explanation. However, the method for preparing the core may be applied for the one-piece golf ball and the center of the thread wound golf ball.

The two-piece golf ball comprises a core which obtained by vulcanizing or press-molding the rubber composition obtained by the method of the present invention, and a cover formed on the core. The rubber composition typically comprises a base rubber, a metal salt of an unsaturated carboxylic acid, a filler, and an organic peroxide. The base rubber may be natural rubber and/or synthetic rubber which has been conventionally used for golf balls. Preferred is high-cis polybutadiene rubber containing not less than 40 molar %, preferably not less than 80 molar % of a cis-1,4 bond. The base rubber may be mixed with natural rubber, polyisoprene rubber, styrene-butadiene rubber, EPDM, and the like.

The metal salt of α,β-unsaturated carboxylic acid, which acts as a co-crosslinking agent, includes mono or divalent metal salts, such as zinc and magnesium salts of α,β-unsaturated carboxylic acids having 3 to 8 carbon atoms (e.g. acrylic acid, methacrylic acid, etc.). Preferred co-crosslinking agent is zinc diacrylate because it imparts high rebound characteristics to the resulting golf ball. An amount of the metal salt of the unsaturated carboxylic acid in the rubber composition is preferably from 10 to 45 parts by weight, based on 100 parts by weight of the base rubber. When the amount of the metal salt of the unsaturated carboxylic acid is larger than 45 parts by weight, the core is too hard. Therefore, shot feel is poor. On the other hand, when the amount of the metal salt of the unsaturated carboxylic acid is smaller than 10 parts by weight, the core is soft. Therefore, rebound characteristics are degraded to reduce flight distance.

The filler, which can be used for a core of golf ball, includes for example, inorganic filler (such as zinc oxide, magnesium oxide, barium sulfate, calcium carbonate and the like), high specific gravity filler (such as powdered tungsten, powdered molybdenum, and the like), and the mixture thereof. An amount of the filler is not limited and can vary depending on specific gravity and the size of core and cover, but is preferably from 10 to 50 parts by weight based on 100 parts by weight of the base rubber. When the amount of the filler is smaller than 10 parts by weight, the core is too light. Therefore, the resulting golf ball is too light. On the other hand, when the amount of the filler is larger than 50 parts by weight, the core is too heavy. Therefore, the resulting golf ball is too heavy.

The organic peroxide, which acts as crosslinking agent or curing agent, includes for example dicumyl peroxide, 1,1-bis(t-butylperoxy)-3,3,5-trimethylcyclohexane, 2,5-dimethyl-2,5-di(t-butylperoxy)-hexane, di-t-butyl peroxide and the like. Preferred organic peroxide is dicumyl peroxide. An amount of the organic peroxide is not limited, but is preferably from 0.3 to 5.0 parts by weight based on 100 parts by weight of the base rubber. When the amount of the organic peroxide is smaller than 0.3 parts by weight, the core is too soft. Therefore, rebound characteristics is degraded to reduce flight distance. On the other hand, when the amount of the organic peroxide is larger than 5.0 parts by weight, the core is too hard. Therefore, shot feel is poor.

The rubber composition can contain other components which have been conventionally used for preparing the core of solid golf balls, such as antioxidant or peptizing agent.

In the method for preparing the rubber composition for golf ball of the present invention, the base rubber and the metal salt of α,β-unsaturated carboxylic acid is firstly mixed in a mixing machine (for example, a kneader, a Banbury mixer and the like, but a kneader is preferable) to obtain the compound A (Process (a)). Then, a filler, an organic peroxide, and optionally antioxidant and the like are added to the compound A, and the mixture is mixed to obtain a compound B (Process (b)).

The mixing condition is suitably selected, but the temperature, the time and the number of revolutions of the machine are controlled so that the temperature of the rubber composition, when discharging the compound B after mixing it, is from 100° to 120° C. For example, the process (a) is performed at a temperature of 100° to 120° C. for 3 to 7 minutes, and the process (b) is performed at a temperature of 100° to 120° C. for 2 to 6 minutes. When the temperature of the rubber composition is lower than 100° C. at the time of discharging from the mixing machine, the ball compression is poor because the peroxide is insufficiently dispersed in the rubber composition. Although the metal salt of the unsaturated carboxylic acid generally coated with zinc stearate, stearic acid, etc., the coating is not melted. Therefore, rebound characteristics is degraded. On the other hand, when the temperature of the rubber composition is higher than 120° C. at the time of discharging from the mixing machine, the ball compression is poor because of the burning of the rubber composition. Therefore, rebound characteristics is degraded. The number of revolutions of the mixing machine is preferably within the range of 10 to 50 rpm. Particularly, the number of revolutions of the mixing machine is preferably within the range of 20 to 40 rpm in the process (b). Optionally, the temperature may be controlled by cool water or hot water. In the case of using a kneader, a ram pressure, by which the temperature is slightly varied, is typically ranged within 2 to 15 kgf. The volume of formulations is preferably 70 to 95 % of the volume of the mixing machine (30 to 100 liters).

The compound B is then mixed and warmed after aging. The mixing is preferably conducted for 4 to 8 minutes at a temperature lower than a temperature raising undesirable reaction, such as lower than 90° C., and more preferably lower than 80° C. Such mixing may be easily conducted by using mixing roll and the like, thereby temperature being difficult to rise. Then, the mixed mixture is extruded to form plugs and then vulcanized and molded to obtain a core. The vulcanizing condition is, for example, at a temperature of 120° to 180° C. for 10 to 60 minutes. The resulting core has a diameter of 35 to 41 mm.

In the two-piece golf ball, the core obtained above is covered with a cover. The cover is generally formed from an ionomer which is known to the art and has been used for the cover of golf balls. The ionomer resin used in the present invention is not limited, but includes a copolymer of α-olefin and α,β-unsaturated carboxylic acid, of which a portion of carboxylic acid groups is neutralized with metal ion. The α-olefins preferably include ethylene and propylene are preferable. The α,β-unsaturated carboxylic acid described above preferably includes acrylic acid, methacrylic acid, and the like. The metal ion which neutralizes a portion of carboxylic acid groups of the copolymer of α-olefin and α,β-unsaturated carboxylic acid includes alkaline metal ion, such as sodium ion, potassium ion, lithium ion and the like; divalent metal ion, such as zinc ion, calcium ion, magnesium ion, and the like; trivalent metal ion, such as aluminum ion, neodymium ion, and the like; and the mixture thereof. Preferred are sodium ion, zinc ion, lithium ion and the like, in view of rebound characteristics, durability and the like. The ionomer resin is not limited, but examples thereof will be shown by a trade name thereof. Examples of the ionomer resin, which is commercially available from Mitsui Du Pont Polychemical Co., include Hi-milan 1557, Hi-milan 1605, Hi-milan 1652, Hi-milan 1705, Hi-milan 1706, Hi-milan 1707, Hi-milan 1855 and Hi-milan 1856. Examples of the ionomer resin, which is commercially available from Exxon Chemical Co., include Iotek 7010, Iotek 8000, and the like. These ionomer resins are used alone or in combination.

The cover used in the present invention may optionally contain fillers (such as barium sulfate, etc.), pigments (such as titanium dioxide, etc.), and the other additives such as a UV absorber, a photostabilizer and a fluorescent agent or a fluorescent brightener, etc., in addition to the resin component, as long as the addition of the additives does not deteriorate the desired performance of the golf ball cover, but an amount of the pigment is preferably from 0.1 to 0.5 parts by weight.

The cover layer of the present invention is formed by a conventional method for forming golf ball cover well known in the art, such as injection molding, pressure molding and the like. A thickness of the cover is preferably 1 to 3 mm. When the thickness is less than 1 mm, the cover is too thin to exhibit the properties of the cover. When the thickness is more than 3 mm, the hardness of the resulting golf ball is too large. Therefore, controllability and shot feel are degraded. When forming cover, many depressions called "dimples" are generally formed on the cover. The golf ball having a dimpled cover is then coated with paint to finish for serving commercial sell.

EXAMPLES

The following Examples and Comparative Examples further illustrate the present invention in detail but are not to be construed to limit the scope thereof.

(Examples 1 to 2 and Comparative Examples 1 to 3)

Production of cores

BR18 (rubber) and zinc diacrylate were firstly introduced into a 55 liters-kneader and kneaded to obtain the compound A, and then, zinc oxide, dicumyl peroxide and Yoshinox 425 (the antioxidant) were introduced into the kneader and kneaded together with the compound A to obtain the compound B, as described in FIG. 1 using the formulation shown in Table 1. The kneading was conducted at the conditions shown in Table 3 (the number of revolutions of kneader, the kneading time and the temperature of discharging the rubber composition). It was conducted at both conditions for the compound A and the compound B. In Comparative Examples 1 to 3, the kneading was conducted at conditions different from Examples. In Comparative Example 1, the temperature of discharging the compound B was set lower than Examples. In Comparative Example 2, the number of revolutions of kneader was set higher, and the temperature of discharging the compound B was set higher than Examples. In Comparative Example 3, the kneading time of the compound B was set longer, and the temperature of discharging the compound B was set higher than Examples. Then, the compound was mixed and warmed with a 60 inches-mixing roll for 6 minutes, and then extruded by a conventional method to form plugs which were pressure-molded at 150° C. for 30 minutes to obtain spherical solid cores having a diameter of 39.0 mm.

TABLE 1

| Kind | Parts by weight |
|---|---|
| BR18 *1 | 100 |
| Zinc diacrylate | 30 |
| Zinc oxide | 18 |
| Dicumyl peroxide | 1.2 |
| Yoshinox 425 *2 | 0.5 |

*1: Polybutadiene (trade name "BR-18") from Japan Synthetic Rubber Co., Ltd.
*2: Antioxidant (trade name "Yoshinox 425") from Yoshitomi Pharmaceutical Inds., Ltd.

Production of golf balls

The core obtained above was directly covered with the cover composition shown in Table 2 by injection molding to obtain golf balls having a weight of 45.4 g and a diameter of 42.7 mm. With respect to the resulting golf balls, ball compression (compression) and coefficient of restitution were determined, and the results were shown in Table 3. The test method is described later.

TABLE 2

| Kind | Parts by weight |
|---|---|
| Hi-milan 1605 *3 | 50 |
| Hi-milan 1706 *4 | 50 |
| Titanium dioxide | 2 |

*3: Hi-milan 1605 (trade name), ethylene-methacrylic acid copolymer ionomer resin obtained by neutralizing with sodium ion, manufactured by Mitsui Du Pont Polychemical Co., Ltd.
*4: Hi-milan 1706 (trade name), ethylene-methacrylic acid copolymer ionomer resin obtained by neutralizing with zinc ion, manufactured by Mitsui Du Pont Polychemical Co., Ltd.

(Comparative Example 4)

Production of core

Figure 2:
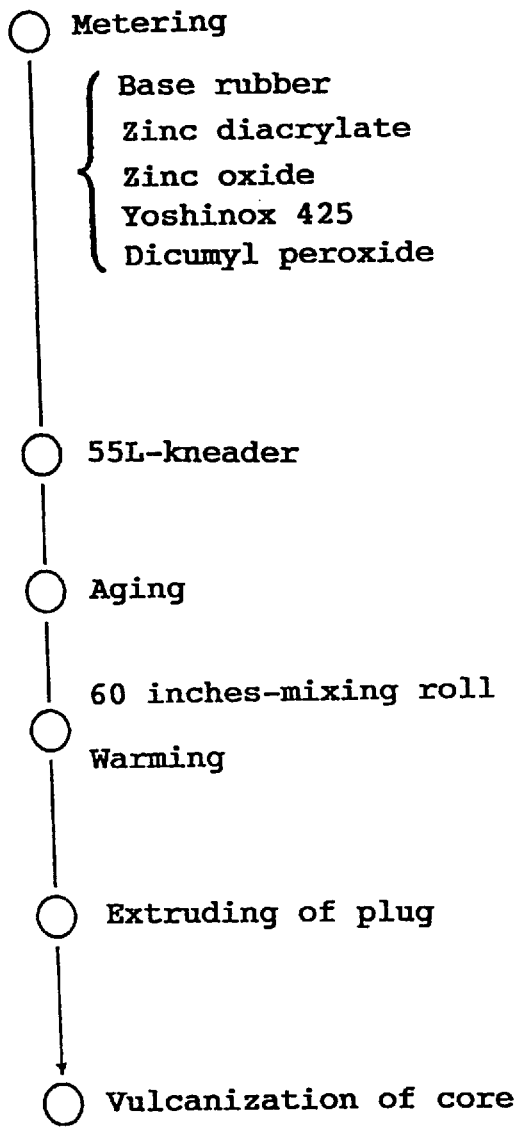
FIG. 2 is a flow chart illustrating a method for preparing the conventional golf ball.

BR18 (rubber), zinc diacrylate, zinc oxide, dicumyl peroxide and Yoshinox 425 (the antioxidant) were simultaneously introduced into a 55 liters-kneader and kneaded to obtain a compound, as described in FIG. 2 using the formulation shown in Table 1. The kneading was conducted at the conditions shown in Table 3 (the number of revolutions of kneader, the kneading time and the temperature of discharging the rubber composition). Then, the compound was mixed and warmed by a 60 inches-mixing roll for 6 minutes, and then extruded by a conventional method to form plugs which were pressure-molded at 150° C. for 30 minutes to obtain a spherical solid core having a diameter of 39.0 mm.

Production of golf ball

The core obtained above was directly covered with the cover composition shown in Table 2 by injection molding to obtain golf ball having a weight of 45.4 g and a diameter of 42.7 mm. With respect to the resulting golf balls, ball compression (compression) and coefficient of restitution were determined, and the results were shown in Table 3. The test method is as follows.

Test method (1) Ball compression

The ball compression of golf balls was measured by an ATTI (described in U.S. Pat. No. 2,278,416) measuring equipment.

(2) Coefficient of restitution

An aluminum cylinder having a weight of 198.45 g was fired to strike against a golf ball at a speed of 45 cm/sec, and the velocity of the golf ball after strike was measured. The coefficient of restitution of the golf ball was calculated from the velocity and the weight of the cylinder and golf ball, and was indicated by an index when that of Example 1 was 100.

TABLE 3

| | Example | | Comparative Example | | | |
|---|---|---|---|---|---|---|
| Item | 1 | 2 | 1 | 2 | 3 | 4 |
| Flow chart (FIG. NO) | 1 | 1 | 1 | 1 | 1 | 2 |
| Number of Revolutions of kneader (rpm) | 20 | 40 | 10 | 60 | 40 | 40 |
| Kneading time (min) | | | | | | |
| Process (a) | 4 | 4 | 4 | 4 | 4 | 8 |
| Process (b) | 4 | 4 | 4 | 4 | 8 | — |
| Temperature of discharging the rubber composition (°C.) | 108 | 117 | 94 | 135 | 138 | 137 |
| Compression (PGA) | 100 | 100 | 98 | 96 | 97 | 97 |
| Coefficient of restitution | 100 | 100 | 95 | 93 | 90 | 90 |

As is apparent from the physical properties of the golf balls of Examples 1 to 2 are comparative with those of the golf balls of Comparative Examples 1 to 4 shown in Table 3, the golf balls of the present invention have excellent coefficient of restitution. The golf ball of Comparative Example 4 has lower coefficient of restitution than that of Examples, because the base rubber, the metal salt of α,β-unsaturated carboxylic acid, the filler, the organic peroxide and the antioxidant were simultaneously kneaded to become the temperature of discharging too high. The golf ball of Comparative Example 1 has lower coefficient of restitution than that of Examples, because the temperature of discharging is too low. The golf ball of Comparative Example 2 has lower coefficient of restitution than that of Examples, because the higher number of revolutions of kneader makes the temperature of discharging too high. The golf ball of Comparative Example 3 has lower coefficient of restitution than that of Examples, because the longer kneading time in the process (b) makes the temperature of discharging too high.

According to the method of the present invention, which comprises the steps of kneading a base rubber and a co-crosslinking agent to obtain a pre-mixture, adding a filler and a organic peroxide to the pre-mixture, and then kneading the mixture with a mixing machine while controlling the temperature of the composition by adjusting the number of revolutions of the machine and the kneading time, there is provided a golf ball having excellent rebound characteristics while maintaining the excellent workability during preparation of the rubber composition for the golf ball.

What is claimed is:

1. A method for preparing a rubber composition for golf balls comprising at least a base rubber, a metal salt of α,β-unsaturated carboxylic acid, a filler and an organic peroxide, comprising the steps of, (a) mixing the base rubber and the metal salt of α,β-unsaturated carboxylic acid to obtain a pre-mixture, (b) adding the filler and the peroxide to the pre-mixture, and mixing in a mixing machine at the number of revolutions of 10 to 50 rpm for 2 to 6 minutes, and (c) discharging the mixed rubber composition with controlling the temperature of the rubber composition to 100° to 120° C.

2. The method according to claim 1, wherein said mixing machine is a kneader.

3. The method according to claim 1, wherein said metal salt of α,β-unsaturated carboxylic acid is zinc diacrylate, and said organic peroxide is dicumyl peroxide.

* * * * *